United States Patent
Morikawa et al.

(10) Patent No.: US 6,309,507 B1
(45) Date of Patent: Oct. 30, 2001

(54) POLYISOCYANATE CURING AGENT FOR LAMINATE ADHESIVE LAMINATE ADHESIVE COMPRISING THE SAME AND ITS USE

(75) Inventors: Yukihiro Morikawa; Toshiaki Sasahara, both of Yokohama; Shin Konishi, Fujisawa, all of (JP)

(73) Assignee: Nippon Polyurethane Industry Co., Ltd., Tokyo (JP)

( * ) Notice: Subject to any disclaimer, the term of this patent is extended or adjusted under 35 U.S.C. 154(b) by 0 days.

(21) Appl. No.: 09/260,126

(22) Filed: Mar. 1, 1999

(51) Int. Cl.$^7$ .................................................. C09J 101/00
(52) U.S. Cl. ........................ 156/331.4; 525/457; 560/330
(58) Field of Search ........................ 156/331.4; 525/457; 560/330

(56) References Cited

U.S. PATENT DOCUMENTS 3,383,400 * 5/1968 Meisert et al. ........................ 560/330
4,882,408 * 11/1989 Blum ..................................... 525/457
5,144,031 * 9/1992 Pedain ................................... 560/330
5,238,999 * 8/1993 Cook et al. ........................... 525/457
5,625,026 * 4/1997 Suzuki et al. ........................ 560/330

FOREIGN PATENT DOCUMENTS 05-112766  5/1993  (JP) .
07-048429  2/1995  (JP) .

* cited by examiner

Primary Examiner—John J. Gallagher
(74) Attorney, Agent, or Firm—Browdy and Neimark

(57) ABSTRACT

A polyisocyanate curing agent for a laminate adhesive, which comprises a hydrophilic polar group-containing polyisocyanate; a laminate adhesive excellent in heat-resistance, durability and adhesiveness to polyolefin film which adhesive comprises the above hydrophilic polar group-containing polyisocyanate and an active hydrogen-containing compound; and use of an adhesive comprising the above polyisocyanate curing agent and an active hydrogen-containing compound in film lamination.

12 Claims, No Drawings

POLYISOCYANATE CURING AGENT FOR LAMINATE ADHESIVE LAMINATE ADHESIVE COMPRISING THE SAME AND ITS USE

BACKGROUND OF THE INVENTION

1. Field of the Invention

This invention relates to a hydrophilic polar group-containing polyisocyanate curing agent for a laminate adhesive, to a laminate adhesive comprising the same, and to use of the laminate adhesive in film lamination.

2. Related Prior Art

Recently, as a packaging method, a complex flexible packaging has been remarkably developed for reasons such as strength of package, protective properties for commercial product, workability during packaging, propaganda effect of package, reduction of packaging cost caused by the supply of a large amount of film at a low cost, and the like.

As an adhesive used in film lamination in such complex flexible packaging, the main product has been a two-pack curing type polyurethane adhesive composed of a resin having an active hydrogen-containing group such as a hydroxyl group or the like (main ingredient) and a polyisocyanate (curing agent) because it is excellent in bond performance, durability and heat resistance and it can be applied to various films in a broad range.

For example, JP-A-5-112,766 discloses an adhesive comprising a polyurethane resin and a polyisocyanate curing agent wherein the polyurethane resin has introduced thereinto a hydrophilic polar group. Moreover, JP-A-7-48,429 describes a polyisocyanate curing agent in which a hydrophilic polar group has been introduced into the polyisocyanate.

However, with the polyisocyanate curing agent described in JP-A-5-112,766, the use of other resins than the polyurethane resin as the main ingredient results in an insufficient adhesiveness to a metal foil, a metallized film or a polyolefin film. Furthermore, in JP-A-7-48,429, an aqueous adhesive is mentioned; however, the aqueous adhesive requires blowing water away and hence much energy becomes necessary therefor.

SUMMARY OF THE INVENTION

An object of this invention is to provide a polyisocyanate curing agent for a laminate adhesive which is excellent in heat-resistance, durability and adhesiveness to a metallic film and a polyolefin film.

A further object of this invention is to provide a laminate adhesive excellent in heat-resistance, durability and adhesiveness to a metallic film and a polyolefin film which adhesive comprises the above-mentioned curing agent.

A still further object of this invention is to provide use of the above adhesive in film lamination.

Other objects and advantages of this invention will become apparent from the following description.

According to this invention, there are provided the following:

(1) a polyisocyanate curing agent for a laminate adhesive, which comprises a hydrophilic polar group-containing polyisocyanate, (2) a laminate adhesive, which comprises the polyisocyanate curing agent mentioned in (1) above and an active hydrogen-containing compound, and (3) use of an adhesive comprising the polyisocyanate curing agent mentioned in (1) above and an active hydrogen-containing compound in film lamination.

DETAILED DESCRIPTION OF THE INVENTION

The polyisocyanate curing agent for a laminate adhesive of this invention comprises a hydrophilic polar group-containing polyisocyanate.

The hydrophilic polar group-containing polyisocyanate can be easily obtained by reacting an organic polyisocyanate with a hydrophilic polar group-containing compound having at least one active hydrogen-containing group.

The organic polyisocyanate includes known organic polyisocyanates and their modified products.

Specific examples thereof include, for example, aromatic diisocyanates such as 2,4-tolylene diisocyanate, 2,6-tolylene diisocyanate, xylylene-1,4-diisocyanate, xylylene-1,3-diisocyanate, xylylene-1,2-diisocyanate, 4,4'-diphenylmethane diisocyanate, 2,4'-diphenylmethane diisocyanate, 4,4'-diphenyl ether diisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropane diisocyanate, m-phenylene diisocyanate, p-phenylene diisocyanate, naphthylene-1,4-diisocyanate, naphthylene-1,5-diisocyanate, 3,3'-dimethoxydiphenyl-4,4'-diisocyanate, tetramethylxylylene diisocyanate and the like; aliphatic diisocyanates such as tetramethylene diisocyanate, hexamethylene diisocyanate, 3-methyl-1,5-pentane diisocyanate, lysine diisocyanate and the like; alicyclic diisocyanates such as isophorone diisocyanate, hydrogenated tolylene diisocyanate, hydrogenated xylylene diisocyanate, hydrogenated diphenylmethane diisocyanate and the like; their adducts; biuret bond-containing polyisocyanates derived from the above diisocyanates, carbodiimide bond-containing polyisocyanates derived from the above diisocyanates, uretonimine bond-containing polyisocyanates derived from the above diisocyanates, uretdione bond-containing polyisocyanates derived from the above diisocyanates and isocyanurate bond-containing polyisocyanates derived from the above diisocyanates; and polymers thereof. The above-mentioned diisocyanates and polyisocyanates derived from the diisocyanates can be used alone or in admixture of two or more.

Among them, isocyanurate bond-containing polyisocyanates derived from hexamethylene diisocyanate and polyisocyanate having isocyanurate bond and uretdione bond derived from hexamethylene diisocyanate are preferable because they are excellent in durability, heat-resistance and the like.

As the hydrophilic polar group in the hydrophilic polar group-containing compound having an active hydrogen-containing group, there are mentioned nonionic polar groups, anionic polar groups, cationic polar groups and amphoteric polar groups. In this invention, they may be used alone or different kinds of hydrophilic polar groups may be adopted in combination. Taking into consideration the stability of the obtained polyisocyanate curing agent for a laminate adhesive, nonionic polar groups are preferred as the hydrophilic polar group of the polyisocyanate curing agent of this invention.

As the nonionic polar group-containing compound having an active hydrogen-containing group, there are mentioned polyoxyalkylene ether mono-ols, polyoxyalkylene ether polyols, polyoxyalkylene fatty acid ester mono-ols and the like in which the proportion of ethylene oxide unit is at least 50 mole % and the number of units repeated is preferably 3 to 90, more preferably 5 to 50. In this invention, the polyoxyalkylene ether mono-ols and the polyoxyalkylene ether polyols are preferable and the polyoxyalkylene ether mono-ols are more preferable.

As an initiator in the production of the above polyoxyalkylene ether mono-ols, there are mentioned methanol, ethanol, n-propanol, i-propanol, n-butanol, i-butanol, t-butanol, cyclohexanol, phenol and the like. As an initiator in the production of the above polyoxyalkylene ether polyols, there are mentioned ethylene glycol, propylene glycol, aniline, trimethylolpropane, glycerol and the like. Among them, compounds having not more than 5 carbon atoms such as methanol, ethanol, ethylene glycol, propylene glycol and the like are preferable because the adhesiveness to a metal becomes good, and mono-ols having not more than 5 carbon atoms such as methanol, ethanol and the like are more preferable.

Moreover, as the fatty acid used in the production of the above polyoxyalkylene fatty acid ester mono-ol, there are mentioned acetic acid, propionic acid, n-butyric acid, i-butyric acid, n-valeric acid, i-valeric acid, caproic acid, glycolic acid, lactic acid, methoxyacetic acid and the like. Among them, fatty acids having not more than 5 carbon atoms such as acetic acid, propionic acid, n-butyric acid, i-butyric acid, n-valeric acid, i-valeric acid and the like are preferred because the adhesiveness to a metal becomes good.

Suitable examples of the anionic polar group-containing compound having an active hydrogen-containing group include those which are each composed of an organic acid having at least one active hydrogen-containing group and a neutralizing agent. As the above organic acid, there are mentioned compounds having carboxylic group, sulfonic acid group, phosphoric acid group, phosphonic acid group, phosphinic acid group, thiosulfonic acid group or the like, and these groups may be introduced as they are (independently) or associated as in a chelate.

Specific examples of the organic acid having at least one active hydrogen-containing group include hydroxyaliphatic acids such as α-hydroxypropionic acid, hydroxysuccinic acid, dihydroxysuccinic acid, ε-hydroxy-propane-1,2,3-tricarboxylic acid, hydroxyacetic acid, α-hydroxybutyric acid, hydroxystearic acid, ricinoleic acid, ricinoelaidic acid, ricinostearolic acid, salicylic acid, mandelic acid and the like and hydroxylation products of unsaturated fatty acids such as oleic acid, linoleic acid and the like; diamine type amino acids such as glutamine, asparagine, lysine, diaminopropionic acid, ornithine, diaminobenzoic acid and the like; monoamine type amino acids such as glycine, alanine, glutamic acid, taurine, aminocaproic acid, aminobenzoic acid, aminoisophthalic acid and the like; aminosulfonic acids such as sulfamic acid, diaminobenzenesulfonic acid and the like; carboxyl group-containing polyols such as 2,2-dimethylolpropionic acid, 2,2-dimethylolbutyric acid and the like; chelate type compounds such as adduct of iminodiacetic acid to. glycidol; polyester polyols obtained by use of 5-sodiumsulfoisophthalic acid or 5-potassiumsulfoisophthalic acid; polycaprolactone obtained by use of water or a carboxyl group-containing alcohol as an initiator; and ester-exchange products of polyesters having an active hydrogen-containing group or polycarbonates having an active hydrogen-containing group with carboxyl group-containing alcohols.

Furthermore, carboxyl group-containing half ester mixtures and carboxyl group-containing half amide mixtures obtained by reacting long chain polyols and the above-mentioned low molecular weight polyols or low molecular weight polyamines with polycarboxylic anhydride can be used. In particular, when a polyol is added to an acid anhydride such as pyromellitic anhydride or the like, two carboxyl groups are formed, so that an anionic polar group can be introduced into the molecular chain of the polyester polyol. As the other anionic polar groups, phosphoric acid and the like are mentioned. Incidentally, the above long chain polyol includes specifically the above-mentioned polyester polyols, polyether polyols, polycarbonate polyols, polyolefin polyols and the like.

As the neutralizing agent, there are mentioned ammonia; organic amines such as ethylamine, trimethylamine, triethylamine, triisopropylamine, tributylamine, triethanolamine, N-methyldiethanolamine, N-phenyldiethanolamine, monoethanolamine, dimethylethanolamine, diethylethanolamine, morpholine, N-methylmorpholine, 2-amino-2-ethyl-1-propanol and the like; alkali metals such as lithium, potassium, sodium and the like; inorganic alkalis such as sodium hydroxide and potassium hydroxide; etc. In order to enhance the weather resistance and water resistance after drying, preferable are ammonia, trimethylamine and triethylamine which are easily dissociated upon heating and are high in volatility.

Each of the organic acid and the neutralizing agent can be used alone or in admixture of two or more.

Suitable examples of the cationic polar group-containing compound having an active hydrogen-containing group are those which are each composed of a tertiary amine having at least one active hydrogen-containing group and a neutralizing agent consisting of an inorganic or organic acid or a quaternizing agent.

As the tertiary amine having at least one active hydrogen-containing group, there are mentioned N,N-dimethylethanolamine, N,N-diethylethanolamine, N,N-dipropylethanolamine, N,N-diphenylethanolamine, N-methyl-N-ethylethanolamine, N-methyl-N-phenylethanolamine, N,N-dimethylpropanolamine, N-methyl-N-ethylpropanolamine, N-methyldiethanolamine, N-ethyldiethanolamine, N-methyldipropanolamine, N-phenyldiethanolamine, N-phenyldipropanolamine, N-hydroxyethyl-N-hydroxypropylmethylamine, N,N'-dihydroxyethylpiperazine, triethanolamine, trisisopropanolamine, N-methyl-bis(3-aminopropyl)amine, N-methyl-bis(2-aminopropyl)amine and the like. In addition, an addition product of an alkylene oxide to ammonia, a primary amine such as methylamine or a secondary amine such as dimethylamine can also be used.

As the inorganic and organic acids, there are mentioned hydrochloric acid, acetic acid, lactic acid, cyanoacetic acid, phosphoric acid, sulfuric acid and the like. As the quaternizing agent, there are mentioned dimethyl sulfate; benzyl chloride; bromoacetamide; chloroacetamide; alkyl halides such as ethyl bromide, propyl bromide, butyl bromide and the like; etc.

As the other cationic polar group-containing compounds, there are mentioned primary amine salts, secondary amine salts, tertiary amine salts, pyridinium alts and the like.

As the amphoteric polar group-containing compound having an active hydrogen-containing group, there can be mentioned a compound produced by reacting a tertiary amino group-containing polyol with sultone which compound has such an amphoteric polar group as sulfobetaine or the like.

In the case of the anionic or cationic polar group-containing compounds, the timing of the addition and reaction of the neutralizing agent and the quaternizing agent may be after the reaction of an organic polyisocyanate with an organic acid having an active hydrogen-containing group and/or a tertiary amine, or alternatively, the organic acid having an active hydrogen-containing group and/or the tertiary amine may be reacted with the neutralizing agent or the quaternizing agent followed by reacting the reaction product obtained with the organic polyisocyanate. The sulfonic acid group-containing compound is preferably neutralized before the reaction with the organic polyisocyanate.

The amount of the hydrophilic polar group introduced into the polyisocyanate curing agent for a laminate adhesive of this invention is as follows:

When the nonionic polar group is introduced, the content of the ethylene oxide unit in the polyisocyanate curing agent is preferably 0.1 to 40% by weight, particularly preferably 0.5 to 30% by weight, in terms of the solid content.

When the anionic or cationic polar group is introduced, the amount of the polar group is preferably 0.1 to 3.0 mmol/g, particularly preferably 0.15 to 2.9 mmol/g.

When the amount of the hydrophilic polar group introduced is lower than the lower limit, the adhesiveness to a metal tends to become insufficient. On the other hand, when the amount exceeds the upper limit, the durability, particularly the water resistance, of the adhesive tends to become insufficient.

The curing agent for a laminate adhesive of this invention may, if necessary, be a reaction product with a hydrophobic group-containing compound having an active hydrogen-containing group as a further reactant. This hydrophobic group-containing compound having an active hydrogen-containing group includes low molecular weight mono-ols such as methanol, ethanol, n-propanol, i-propanol, n-butanol, i-butanol, t-butanol, pentanol, hexanol, heptanol, octanol, 2-ethylhexanol, benzyl alcohol, cyclohexanol, alkylene glycol monoalkyl ethers and the like; low molecular weight primary monoamines such as ethylamine, butylamine, aniline and the like; low molecular weight secondary monoamines such as diethylamine, dibutylamine, methylaniline; polyesters having an active hydrogen-containing group; polyethers having an active hydrogen-containing group in which the proportion of ethylene oxide unit is less than 50 mole %; polycarbonate having an active hydrogen-containing group; polyolefins having an active hydrogen-containing group; hydroxy-higher fatty acids having at least 6 carbon atoms; esters of the hydroxy-higher fatty acids; and the like.

The reaction temperature at which the organic polyisocyanate is reacted with the compound having an active hydrogen-containing group is preferably 10 to 120° C., more preferably 30 to 100° C. Moreover, the reaction with the optional hydrophobic group-containing compound having an active hydrogen-containing group may be effected simultaneously with or at the different time from the introduction of the hydrophilic polar group. At this time, if necessary, a urethanization catalyst such as dibutyltin dilaurate or triethylenediamine may be added.

The isocyanate group content of the polyisocyanate curing agent for a laminate adhesive thus obtained is preferably 5 to 50% by weight, particularly preferably 10 to 40% by weight.

The average NCO functionality of the polyisocyanate curing agent for a laminate adhesive of this invention is preferably 2.0 to 5.0, particularly preferably 2.0 to 4.0. When the average NCO functionality is less than 2.0, the cross-linking density becomes small and hence the bonding strength tends to become insufficient. Moreover, when the average NCO functionality exceeds 5.0, the cross-link density of a cured product becomes unnecessarily large, and hence, the flexibility of the bonded layer tends to become insufficient.

The active hydrogen-containing compound used as the main ingredient in combination with the polyisocyanate curing agent in the laminate adhesive of this invention has at least one active hydrogen-containing group in the molecule, and is preferably an active hydrogen-containing high molecular weight compound having a number average molecular weight of 500 to 100,000, particularly preferably 1,000 to 80,000. As examples thereof, there are mentioned, for example, polyurethane resin; polyester resin; polyamide resin; acrylic resin; coumarone resin; melamine resin; urea resin; rosin resin; epoxy resin; phenolic resin; polyvinyl acetate; cellulose type resin such as cellulose or the like; natural resin such as starch, hide glue or the like; polyvinyl alcohol; derivatives of them; and the like, each of which has at least one active hydrogen-containing group in the molecule. Among these resins, polyurethane resin is preferable in view of the adhesiveness to a substrate, durability and the like.

This polyurethane resin includes, in addition to polyurethane resins having a urethane bond, polyurethane-urea resins having a urethane bond and a urea bond, and the like.

In the molecule of the polyurethane resin, at least one, preferably at least two, active hydrogen-containing groups such as hydroxyl group and the like are contained. This polyurethane resin is used in combination with a hydrophilic polar group-containing polyisocyanate curing agent for a laminate adhesive as a two-pack curing type laminate adhesive.

The polyurethane resin is obtained by a known reaction between a compound having an active hydrogen-containing group and an organic polyisocyanate.

The compound having an active hydrogen-containing group is called a long chain polyol and/or a chain extender. In the polyurethane resin in this invention, the long chain polyol is contained preferably in a proportion of 50 to 90% by weight.

As the long chain polyol, there are mentioned polyester polyol, polycarbonate polyol, polyether polyol, polyolefin polyol, vegetable oil type polyol, copolyol of them and the like. These long chain polyols may be used alone or in admixture of two or more. The long chain polyol has preferably a number average molecular weight of 500 to 10,000. In this invention, polyester polyol is preferable in view of adhesiveness, durability and the like.

As the above-mentioned polyester polyol, there are mentioned polyester polyols and polyesteramide polyols which are obtained by dehydration-condensation reaction of at least one member selected from the group consisting of polycarboxylic acids such as succinic acid, adipic acid, sebacic acid, azelaic acid, terephthalic acid, isophthalic acid, orthophthalic acid, hexahydroterephthalic acid, hexahydroisophthalic acid, hexahydroorthopthalic acid, naphthalenedicarboxylic acid, trimellitic acid and the like; esters thereof; anhydrides thereof; etc. with at least one member selected from the group consisting of low molecular weight polyols such as ethylene glycol, 1,2-propylene glycol, 1,3-propylene glycol, 1,3-butanediol, 1,4-butanediol, 1,5-pentanediol, 1,6-hexanediol, 3-methyl-1,5-pentanediol, neopentyl glycol, 1,8-octanediol, 1,9-nonanediol, diethylene glycol, dipropylene glycol, 1,4-cyclohexanedimethanol, an ethylene oxide or propylene oxide adduct of bisphenol A, glycerol, trimethylolpropane, pentaerythritol and the like; low molecular weight polyamines such as hexamethylenediamine, xylylenediamine, isophoronediamine and the like; low molecular weight aminoalcohols such as monoethanolamine, diethanolamine and the like.

Incidentally, in this invention, the phrase "low molecular weight" in the terms "low molecular weight polyol", "low molecular weight polyamine" and "low molecular weight aminoalcohol" refers to a number average molecular weight of less than 500.

Moreover, there are also mentioned lactone-type polyester polyols obtained by ring-opening polymerization of a cyclic ester (lactone) monomer such as ε-caprolactone, γ-valerolactone or the like using the above-mentioned low molecular weight polyol as an initiator.

As the polycarbonate polyol, there are mentioned those obtained by subjecting the above-mentioned low molecular weight polyol and diethylene carbonate, dimethyl carbonate, diethyl carbonate, diphenyl carbonate or the like to dealcohol reaction, dephenol reaction or the like.

As the polyether polyol, there are mentioned polyethylene glycols, polypropylene glycol, polytetramethylene ether glycol and the like which are obtained by ring-opening polymerization of ethylene oxide, propylene oxide and tetrahydrofuran and the like; polyether polyols obtained by copolymerization of them; polyesterether polyols obtained by use of the above-mentioned polyester polyol or polycarbonate polyol as an initiator; and the like.

As the polyolefin polyol, there are mentioned, for example, hydroxyl group-containing polybutadiene; hydrogenation product of hydroxyl group-containing polybutadiene; hydroxyl group-containing polyisoprene; hydrogenation product of hydroxyl group-containing polyisoprene; hydroxyl group-containing chlorinated polypropylene; hydroxyl group-containing chlorinated polyethylene; and the like.

As the vegetable oil type polyol, there are mentioned castor oil type polyol, silk fibroin and the like.

Furthermore, as the long chain polyol, there can be suitably used, in addition to dimeric acid type polyol and hydrogenated dimeric acid type polyol, such resins as polyester resin; polyamide resin; acrylic resin; coumarone resin; melamine resin; urea resin; rosin resin; epoxy resin; phenolic resin; cellulose type resin such as cellulose or the like; natural resin such as starch, hide glue or the like; polyvinyl alcohol; derivatives thereof; and the like as far as they have at least two active hydrogen-containing groups. The number average molecular weights of them are preferably 500 to 10,000.

The chain extender is a low molecular weight compound having at least two active hydrogen-containing groups in the molecule, and there are mentioned the above-mentioned low molecular weight polyols, low molecular weight polyamines, low molecular weight aminoalcohols and the like. These can be used alone or in admixture of two or more.

As the organic polyisocyanate, there are mentioned organic diisocyanates which are used in the production of the above curing agent for a laminate adhesive, their modified products and the like.

In the synthesis of the above-mentioned polyurethane resin, the isocyanate group/active hydrogen-containing group ratio (mole ratio) between the organic polyisocyanate and the compound having an active hydrogen-containing group is preferably 0.6/1 to 1/0.6. In the synthesis of the polyurethane resin, it is important to determine the conditions under which no gelation is caused by suitably selecting the average functionality of the active hydrogen-containing group of the compound having an active hydrogen-containing group depending upon the average NCO functionality of the organic polyisocyanate and blend the necessary starting materials so as to satisfy the above conditions. The blending ratio is in accordance with the gelation theory, based on which J. P. Flory, Khun et al. have theoretically calculated the blending ratio; however, actually, the polyurethane resin can be produced without gelation by reacting the above compound having an active hydrogen-containing group with the organic polyisocyanate at a blending ratio in which the reactivity ratio of the reactive groups contained in each molecule of the above two compounds is taken into consideration.

The polyurethane resin synthesized contains an active hydrogen-containing group or an isocyanate group and has a number average molecular weight of preferably 800 to 100,000, particularly preferably 1,000 to 80,000. When the number average molecular weight is too large, the resin viscosity becomes high and the workability becomes inferior. In addition, when the number average molecular weight is too small, the bonding strength becomes insufficient.

In the production of the polyurethane resin, there can be used a heretofore known method, namely, a solution reaction method by which the starting materials are dissolved in an organic solvent and the resulting solution is subjected to reaction, a solvent-free reaction method by which the starting materials are sufficiently mixed in the absence of a solvent and then subjected to reaction, and other like methods.

Furthermore, the polyurethane resin can be synthesized by other known methods such as a one-shot method by which the compound having an active hydrogen-containing group and the organic polyisocyanate are subjected to reaction at one time, a prepolymer method in which an isocyanate-terminated prepolymer is previously synthesized by reacting the compound having an active hydrogen-containing group with the organic diisocyanate in the state that the isocyanate group is excessive to synthesize an isocyanate group-terminated prepolymer and thereafter reacting the prepolymer with the compound having an active hydrogen-containing group, and other like methods.

In the case of the one-shot method, the isocyanate group/active hydrogen-containing group ratio is preferably 0.5 to 2.0, particularly preferably 0.8 to 1.5. When the ratio is less than 0.5, the molecular weight of the polyurethane resin becomes too small and the durability becomes insufficient. When the ratio is more than 2.0, it follows that in the synthesis of the resin, the isocyanate which does not participate in the reaction is present in a large amount.

In the case of the prepolymer method, the isocyanate group/active hydrogen-containing group ratio in the synthesis of the prepolymer is preferably 1.1 to 5.0, particularly preferably 1.5 to 4.0. When the ratio is less than 1.1, the molecular weight of the prepolymer becomes too large, and it becomes difficult for the prepolymer to be subjected to the subsequent reaction. When the ratio exceeds 5.0, the adhesiveness becomes poor.

As the compound having an active hydrogen-containing group to be reacted after the synthesis of the isocyanate group-terminated prepolymer, there are mentioned the above-mentioned polyols, polyamines, amino-alcohols and the like. Moreover, there may, if necessary, be partly used an end-blocking agent, for example, a monoamine such as ethylamine, diethylamine, aniline or the like; a monool such as methanol, ethanol or the like; etc.

In the synthesis of the isocyanate group-terminated prepolymer and polyurethane resin, there can be used such additives as usually used in the production of polyurethane resins, for example, catalysts, stabilizers and the like. As such catalysts, there are mentioned tertiary amines such as triethylamine, triethylenediamine and the like; metal salts such as potassium acetate, zinc stearate and the like; organometallic compounds such as dibutyltin laurate, dibutyltin oxide and the like. As the stabilizers, there are mentioned stabilizers against ultraviolet rays such as substituted benzotriazoles and the like; stabilizers against thermal oxidation such as phenol derivatives and the like; etc. Incidentally, the reaction temperature in the urethanization is preferably 10 to 120° C., more preferably 30 to 100° C.

Incidentally, the curing agent for a laminate adhesive of this invention and the laminate adhesive of this invention may have compounded therewith those additives and adjuvants which are usually used in the general adhesives. The additives and adjuvants include, for example, pigments, dyes, coupling agents, antiblocking agents, dispersion stabilizers, viscosity modifiers, leveling agents, antigelling agents, light stabilizers, antioxidants, ultraviolet absorbers, heat-resistance improvers, plasticizers, antistatic agents, reinforcing agents, catalysts, thixotropic agents, microbicides, fungicides, lubricants, inorganic and organic fillers and the like. As the compounding method, there can be used known methods such as stirring, dispersion and the like.

Furthermore, in this invention, an organic solvent may be co-used for viscosity modification and wettability improvement. As the organic solvent, there are mentioned aromatic solvents such as toluene, xylene, Swasol (a trade name of COSMO OIL CO., LTD. for aromatic hydrocarbon solvent), Solvesso (a trade name of EXXON CHEMICAL CORP. for an aromatic hydrocarbon solvent) and the like; ketone solvents such as acetone, methyl ethyl ketone, methyl isobutyl ketone, cyclohexanone and the like; alcohol solvents such as methanol, ethanol, isopropanol and the like; ester solvents such as ethyl acetate, butyl acetate, isobutyl acetate and the like; glycol ether ester solvents such as ethylene glycol ethyl ether acetate, propylene glycol methyl ether acetate, 3-methyl- 3-methoxybutyl acetate, ethyl 3-ethoxypropionate and the like; ether solvents such as tetrahydrofuran, dioxane and the like; etc. These solvents can be used alone or in admixture of two or more.

The blending ratio of the active hydrogen-containing compound as the main ingredient to the polyisocyanate curing agent is 1 to 200 parts by weight, particularly preferably 5 to 180 parts by weight of the polyisocyanate curing agent, particularly preferably 5 to 180 parts by weight, per 100 parts by weight of the active hydrogen-containing compound (in terms of the solid content). When the amount of the polyisocyanate curing agent is too small, the durability of cross-linked resin becomes insufficient, and when it is too large, the cross-linked resin becomes insufficient in flexibility.

In the laminate adhesive of this invention, the polyurethane resin may be a blend with other resins in a proportion of not more than 1,000 parts by weight per 100 parts by weight of the polyurethane resin. As the said other resins, there are mentioned polyamide resin, polyester resin, acrylic resin, epoxy resin, polyvinyl chloride resin, ethylene-vinyl acetate resin, nitrile resin, cellulosic resin such as nitrocellulose or the like, petroleum resin and the like.

The laminate adhesive of this invention is excellent in adhesiveness to various substrates, durability and the like, and hence, can be used in various fields such as adhesives for film lamination, plywood, furniture, automobile, rail road, electrical appliances, nonwoven fabrics, shoes, bag and the like, and is particularly useful in film lamination. Moreover, it is excellent in adhesiveness to a metal or a polyolefin, and hence, is useful as an adhesive for laminating a metal foil, a metallized film, a polyolefin film or the like.

The film to be laminated includes high polymer films, for example, oriented polypropylene film, non-oriented polypropylene film, polyethylene terephthalate film, polybutylene terephthalate film, polyethylene naphthylate film, polybutylene naphthylate film, nylon film, low density polyethylene film, medium density polyethylene film, high density polyethylene film, ethylene-vinyl acetate copolymer film, ethylene-vinyl alcohol copolymer film, polyvinyl chloride film, polyvinyl alcohol film, polystyrene film, polycarbonate film, polyvinylidene chloride film, Cellophane and the like; metal foils such as aluminum foil, copper foil and the like; films formed by coating high polymer films with these metals by vapor deposition; paper and the above films coated with a polymer; and the like.

Incidentally, the high polymer film is made more preferable for improvement in adhesion by subjecting it to a surface-treatment such as a corona discharge treatment or the like. Moreover, in the case of the polymer-coated film, it is necessary to take into consideration the kind, amount and surface characteristics of the polymer used in the coating.

As the lamination method using the laminate adhesive of this invention, there can be applied wet lamination, dry lamination, hot-melt lamination, extrusion lamination, non-solvent lamination and the like.

The amount of the laminate adhesive coated is preferably 0.5 to 10 g/m$^2$, particularly preferably 1 to 8 g/m$^2$ as the resin content. When the amount is outside the above range, the bonding strength tends to become insufficient.

When the film is coated with the adhesive, the coated film is, if necessary, allowed to stand as it is for a certain period of time and then laminated. Thereafter, if necessary, a pressure is applied and a heat is applied to accelerate the curing reaction. The preferable pressure at this time is 0.01 to 2 MPa per unit area or unit length and the preferable temperature is 40 to 150° C.

By such a method, it becomes possible to produce not only a laminate of two sheets of film but also a laminate of at least three sheets of film.

DESCRIPTION OF PREFERRED EMBODIMENTS

Examples are shown below to explain this invention in more detail. However, this invention should not be construed to be limited to only the Examples. Incidentally, in Synthesis Examples, Examples and Comparative Examples, part and % are by weight unless otherwise specified.

Synthesis of Polyisocyanate Curing Agent

SYNTHESIS EXAMPLE 1

In a reactor equipped with a stirring means, a thermometer, a reflux condenser and a nitrogen gas-introducing tube were placed 86 parts of C-HX which is an isocyanurate bond-containing polyisocyanate derived from hexamethylene diisocyanate and 14 parts of a mono-ol [Mono-ol (1)], and the resulting mixture was subjected to reaction at 70° C. for 3 hours to obtain a polyisocyanate curing agent (Curing Agent A). The isocyanate group content of Curing Agent A was 16.8%.

SYNTHESIS EXAMPLE 2

In the same reactor as in Synthesis Example 1 were placed 98 parts of MR-200 which is a mixture of diphenylmethane diisocyanate and polymethylene-polyphenylene polyisocyanate and 2 parts of a mono-ol [Mono-ol (2)], and the resulting mixture was subjected to reaction at 70° C. for 3 hours to obtain a polyisocyanate curing agent (Curing Agent B). The isocyanate group content of Curing Agent B was 30.3%.

SYNTHESIS EXAMPLE 3

In the same reactor as in Synthesis Example 1 were placed 86 parts of C-HX, 10 parts of a mono-ol [Mono-ol (3)] and 4 parts of another monool [Mono-ol (4)], and the resulting mixture was subjected to reaction at 70° C. for 3 hours to obtain a polyisocyanate curing agent (Curing Agent C). The isocyanate group content of Curing Agent C was 17.7%.

SYNTHESIS EXAMPLE 4

In the same reactor as in Synthesis Example 1 was placed 98 parts of IPDI and it was heated to 50° C. Thereafter, 2 parts of a polyol [Polyol (1)] was placed therein and the resulting mixture was subjected to reaction at 70° C. for 3 hours to obtain a polyisocyanate curing agent (Curing Agent D). The isocyanate group content of Curing Agent D was 37.0%.

SYNTHESIS EXAMPLE 5

In the same reactor as in Synthesis Example 1 were placed 3,000 parts of HDI and 6 parts of trioctylphosphine which was a uretdione-forming and isocyanurate-forming catalyst, and the resulting mixture was heated with stirring to 65 to 70° C. and subjected to reaction at the same temperature for 6 hours. Subsequently, 3.5 parts of phosphoric acid was added to terminate the reaction, thereby obtaining a pale yellow reaction mixture having an isocyanate group content of 30.3%. From this reaction mixture, unreacted HDI was removed by thin film distillation at 120° C. at 0.01 Torr to obtain a HDI-derived, uretdione bond-containing polyisocyanate. The isocyanate group content of the product was 18.7%, and it was confirmed by FT-IR and $C^{13}$-NMR that in this product, isocyanate group, uretdione bond and isocyanurate bond existed. In addition, this product was heated to 180° C. to dissociate uretdione bond and the total amount of the originally existing isocyanate group and the isocyanate group produced by the dissociation of the uretdione bond was determined to find that the isocyanate group content was 30.8%. Therefore, the content of the isocyanate group produced by the dissociation of the uretdione bond was 12.1%. Moreover, the isocyanurate bond content was 19.2%.

Subsequently, in the same reactor as in Synthesis Example 1 were placed 86 parts of the above HDI-derived, uretdione bond-containing polyisocyanate and 14 parts of Monool (1) and the resulting mixture was subjected to reaction at 70° C. for 3 hours to obtain a polyisocyanate curing agent (Curing Agent E). The isocyanate group content of Curing Agent E was 14.7%.

The materials used and the isocyanate contents of the isocyanate curing agents obtained in Synthesis Examples 1 to 5 are shown in Table 1.

TABLE 1

| | Synthesis Example | | | | |
|---|---|---|---|---|---|
| | 1 | 2 | 3 | 4 | 5 |
| Organic polyisocyanate (part) | | | | | |
| C-HX | 86 | | 86 | | |
| MR-200 | | 98 | | | |
| IPDI | | | | 98 | |
| HDI-derived, uretdione bond-containing polyisocyanate | | | | | 86 |
| Hydrophilic polar group-containing compound having active hydrogen-containing group (part) | | | | | |
| Monool (1) | 14 | | | | 14 |
| Monool (2) | | 2 | | | |
| Monool (3) | | | 10 | | |
| Polyol (1) | | | | 2 | |
| Hydrophobic group-containing compound having active hydrogen-containing group (part) | | | | | |
| Monool (4) | | | 4 | | |
| Curing Agent | A | B | C | D | E |
| Isocyanate group content (%) | 16.8 | 30.3 | 17.7 | 37.0 | 14.7 |

In Synthesis Examples 1 to 5 and Table 1,

C-HX: Coronate HX (manufactured by NIPPON POLYURETHANE INDUSTRY CO., LTD., isocyanate group content: 21.3%)

MR-200: Millionate MR-200 (manufactured by NIPPON POLYURETHANE INDUSTRY CO., LTD., isocyanate group content: 31.0%)

IPDI: Isophorone diisocyanate

HDI: Hexamethylene diisocyanate

Mono-ol (1): A monool formed by adding EO/PO=100/0 (mole ratio) to MeOH as an initiator (number average molecular weight: 400)

Mono-ol (2): A mono-ol formed by adding EO/PO=80/20 (mole ratio) to EtOH as an initiator (number average molecular weight: 700)

Mono-ol (3): A mono-ol formed by adding EO/PO=90/10 (mole ratio) to MeOH as an initiator (number average molecular weight: 1,000)

Monool (4): Methyl ricinoleate

Polyol (1): A diol formed by adding EO/PO=90/10 (mole ratio) to EG as an initiator (number average molecular weight: 1,000)

Incidentally, in Monools (1) to (4) and Polyol (1),

EO: Ethylene oxide

PO: Propylene oxide

MeOH: Methanol

EtOH: Ethanol

EG: Ethylene glycol.

Synthesis of polyurethane resin

SYNTHESIS EXAMPLE 6

In a reactor equipped with a stirrer, a thermometer, a nitrogen-sealing tube and a condenser were placed 186 parts of a polyol (Polyol A) and 350 parts of ethyl acetate, and the resulting mixture was dissolved at 30° C. Subsequently, 83 parts of IPDI and 0.03 part of DBTDL were added to the solution and the resulting mixture was subjected to reaction at 70° C. for 3 hours. Subsequently, the reaction mixture was cooled to 30° C. and thereafter a previously prepared amine solution consisting of 350 parts of MEK, 29 parts of IPDA and 2 parts of MEA was added to the reaction mixture, after which the resulting mixture was subjected to reaction to obtain a polyurethane resin having a solid content of 30% (PU-1).

SYNTHESIS EXAMPLE 7

In the same reactor as in Synthesis Example 6 were placed 246 parts of a polyol (Polyol B), 13 parts of NPG and 200 parts of ethyl acetate, and the resulting mixture was dissolved at 30° C. Subsequently, 41 parts of TDI and 0.03 part of DBTDL were added to the solution, after which the resulting mixture was subjected to reaction at 80° C. for 4 hours. The viscosity increased with the progress of the urethanization reaction, so that 150 parts of ethyl acetate was added in several portions. When the peak of isocyanate group in the infrared spectroscopic analysis had disappeared, the reaction product was further diluted with 350 parts of ethyl acetate to obtain a polyurethane resin having a solid content of 30% (PU-2).

SYNTHESIS EXAMPLE 8

In the same reactor as in Synthesis Example 1 were placed 179 parts of Polyol B, 89 parts of another polyol (Polyol C) and 200 parts of ethyl acetate, and the resulting mixture was dissolved at 30° C. Subsequently, 32 parts of $H_6XDI$ and 0.03 part of DBTDL were added to the solution and the resulting mixture was subjected to reaction at 80° C. The viscosity increased with the progress of the urethanization reaction, so that 150 parts of ethyl acetate was added in several portions. When the peak of isocyanate group in the infrared spectroscopic analysis had disappeared, the reaction product was further diluted with 350 parts of ethyl acetate to obtain a polyurethane resin having a solid content of 30% (PU-3).

SYNTHESIS EXAMPLE 9

In the same reactor as in Synthesis Example 1 was placed 778 parts of a polyol (Polyol D), and it was heated to 50° C. Subsequently, 222 parts of MDI was placed therein and the resulting mixture was subjected to reaction at 80° C. When the peak of isocyanate group in the infrared spectroscopic analysis had disappeared, the reaction was terminated to obtain a polyurethane resin having a solid content of 100% (PU-4).

The materials used and the solid contents of the polyurethane resins obtained in Synthesis Examples 6 to 9 are shown in Table 2.

TABLE 2

| | Synthesis Example | | | |
|---|---|---|---|---|
| | 6 | 7 | 8 | 9 |
| Long chain polyol (part) | | | | |
| Polyol A | 186 | | | |
| Polyol B | | 246 | 179 | |
| Polyol C | | | 89 | |
| Polyol D | | | | 778 |

TABLE 2-continued

| | Synthesis Example | | | |
|---|---|---|---|---|
| | 6 | 7 | 8 | 9 |
| Chain extender (part) | | | | |
| IPDA | 29 | | | |
| NPG | | 13 | | |
| Organic polyisocyanate (part) | | | | |
| IPDI | 83 | | | |
| TDI | | 41 | | |
| $H_6XDI$ | | | 32 | |
| MDI | | | | 222 |
| Reaction terminator (part) | | | | |
| MEA | 2 | | | |
| Urethanization catalyst (part) | | | | |
| DBTDL | 0.03 | 0.03 | 0.03 | |
| Solvent (part) | | | | |
| Ethyl acetate | 350 | 700 | 700 | |
| MEK | 350 | | | |
| Solid content (%) | 30 | 30 | 30 | 100 |
| Polyurethane resin | PU-1 | PU-2 | PU-3 | PU-4 |

In Synthesis Examples 6 to 9 and Table 2,

Polyol A: Polyester diol (number average molecular weight: 1,000) obtained from 3-methyl-1,5-pentanediol and adipic acid Polyol B: Polyester diol (number average molecular weight: 2,000) obtained from ethylene glycol/neopentyl glycol=1/1 (mole ratio) and adipic acid/isophthalic acid=1/1 (mole ratio)

Polyol C: Rosin-derived diol (KE-601, a trade name of Arakawa Kagaku Kogyo K. K., number average molecular weight: 1,000)

Polyol D: Polyester diol (number average molecular weight: 500) obtained from 3-methyl-1,5-pentanediol and adipic acid IPDA: Isophoronediamine
NPG: Neopentyl glycol
IPDI: Isophorone diisocyanate
TDI: 2,4-Tolylene diisocyanate
$H_6XDI$: Hydrogenated xylylene diisocyanate
MDI: 4,4'-Diphenylmethane diisocyanate
MEA: Monoethanolamine
DBTDL: Dibutyltin dilaurate
MEK: Methyl ethyl ketone Bonding test-1
(Formulation of adhesive)

With the formulations shown in Table 3, adhesives AD-1 to AD-8 were prepared. Incidentally, the proportions shown in Table 3 are all in terms of the solid content.

TABLE 3

| | Polyurethane resin | | | Polyisocyanate curing agent | | | | | | | |
|---|---|---|---|---|---|---|---|---|---|---|---|
| | PU-1 | PU-2 | PU-3 | A | B | C | D | E | C-L | C-HL | C-HX |
| AD-1 | 100 | | | 15 | | | | | | | |
| AD-2 | | 100 | | | 15 | | | | | | |

TABLE 3-continued

| | Polyurethane resin | | | Polyisocyanate curing agent | | | | | | | |
|---|---|---|---|---|---|---|---|---|---|---|---|
| | PU-1 | PU-2 | PU-3 | A | B | C | D | E | C-L | C-HL | C-HX |
| AD-3 | | | 100 | | | 15 | | | | | |
| AD-4 | 100 | | | | | | 15 | | | | |
| AD-5 | | 50 | 50 | | | | | 15 | | | |
| AD-6 | 100 | | | | | | | | 15 | | |
| AD-7 | | 100 | | | | | | | | 15 | |
| AD-8 | | | 100 | | | | | | | | 15 |

In Table 3,
C-L: Tolylene diisocyanate adduct curing agent (Coronate L, a trade name of NIPPON POLYURETHANE INDUSTRY CO., LTD., solid content: 75%)
C-HL: Hexamethylene diisocyanate adduct curing agent (Coronate HL, a trade name of NIPPON POLYURETHANE INDUSTRY CO., LTD., solid content: 75%)
C-HX: HDI-derived, isocyanurate bond-containing polyisocyanate curing agent (Coronate HX, a trade name of NIPPON POLYURETHANE INDUSTRY CO., LTD., solid content: 100%).
(Measurement of bonding strength)

EXAMPLE 1

AD-1, a corona-treated PET film (film thickness: 12 $\mu$), an aluminum foil (film thickness: 7 $\mu$), a corona-treated CPP film (film thickness: 70 $\mu$) were set in a dry laminator. AD-1 was coated on the corona-treated surface of the corona-treated PET film by a gravure roll so that the dry weight of AD-1 coated became 3.5 g/m². After the coating of the adhesive, the film was passed through a drying oven set at 80° C., and then laminated to the aluminum foil by a laminating roll of 100° C.×0.3 MPa. Subsequently, AD-1 was coated on the aluminum foil by a gravure roll so that the dry weight of AD-1 coated became 3.5 g/m². After the coating of the adhesive, the aluminum foil was passed through a drying oven set at 80° C. and then laminated to the corona-treated surface of the corona-treated CPP by a laminating roll of 100° C.×0.3 MPa. Incidentally, the film speed was 50 m/min. After the lamination, the resulting assembly was cured at 40° C. for 3 days to obtain a laminate film (Laminate Film A).

Laminate Film A was cut in a 15-mm width and subjected to T-peel test at a drawing speed of 300 mm/min in a measurement atmosphere of 25° C. and 50% RH.

Moreover, the three sides of Laminate Film A were heat-sealed so that the CPP surface came to inside under the conditions of 180° C.×0.3 MPa×1 sec to prepare a bag, after which this bag was filled with a mixture of catsup/salad oil/vinegar=1/1/1 (weight ratio) and then heat-sealed under the same conditions as mentioned above to close the bag. The bag was boiled at 120° C. for 30 minutes and thereafter subjected to a T-peel test (sample width: 15 mm, drawing speed: 300 mm/min, measurement atmosphere: 25° C.×50% RH).

EXAMPLE 2 TO 5 AND COMPARATIVE EXAMPLES 1 TO 3 same procedure as in Example 1 was repeated, except that AD-1 was replaced with one of AD-2 to AD-8 to prepare laminate films and these laminate films were subjected to the same test as in Example 1.

The test results obtained in Examples 1 to 5 and Comparative Examples 1 to 3 are shown in Table 4.

TABLE 4

| | | | Peel strength (gf/15 mm) | | Peel strength after retort-treatment (gf/15 mm) | |
|---|---|---|---|---|---|---|
| | | Adhesive | PET/Al | Al/CPP | PET/Al | Al/CPP |
| Example | 1 | AD-1 | 400 PETf | 1200 Alf | 400 PETf | 1100 Alf |
| | 2 | AD-2 | 360 PETf | 970 Alf | 380 PETf | 1050 Alf |
| | 3 | AD-3 | 380 PETf | 1080 Alf | 400 PETf | 1050 Alf |
| | 4 | AD-4 | 400 PETf | 1100 Alf | 390 PETf | 1100 Alf |
| | 5 | AD-5 | 370 PETf | 1000 Alf | 350 PETf | 1000 Alf |
| Comparative Example | 1 | AD-6 | 400 PETf | 740 Alf | 280 | 590 |
| | 2 | AD-7 | 380 PETf | 680 Alf | 250 | 580 |
| | 3 | AD-8 | 390 PETf | 750 Alf | 260 | 640 |

In Examples 1 to 5, Comparative Examples 1 to 3 and Table 4,
PET: Polyethylene terephthalate
Al: Aluminum foil
CPP: Non-oriented polypropylene
PETf: PET material failed
Alf: Al material failed.

Bonding test-2
(Formulation of adhesive)
Adhesives (AD-9 to AD-12) were prepared with the formulation shown in Table 5.
(Measurement of bonding strength)

EXAMPLE 6

AD-9 was heated to 60° C. and then coated on the corona-treated surface of a corona-treated PET film (film thickness: 12 $\mu$) by a roll coater so that the amount of the adhesive coated became 2.0 g/m². After the coating of the adhesive, the adhesive-coated PET film was laminated to the aluminum foil surface of the non-oriented polypropylene film coated with aluminum by vapor deposition (film thickness: 60 $\mu$) by a laminating roll of 100° C.×0.3 MPa. Incidentally, the film speed was 50 m/min. After the lamination, the resulting assembly was cured at 40° C. for 3 days to obtain a laminate film (Laminate Film I).

Laminate Film I was cut as it was in a 15-mm width, and then subjected to T-peel test at a drawing speed of 300 m/min in a measurement atmosphere of 25° C. and 50% RH.

EXAMPLE 7 AND COMPARATIVE EXAMPLES 4 AND 5

In the same manner as in Example 6, except that AD-9 was replaced by one of AD-10 to AD-12, laminate films were prepared and subjected to the same test as in Example 6.

The test results obtained in Examples 6 and 7 and Comparative Examples 4 and 5 are shown in Table 5.

TABLE 5

| | | Adhesive | Main ingredient PES | Main ingredient PU-4 | Curing agent A | Curing agent C-HX | Peel strength (gf/15 mm) PET/VM-CPP |
|---|---|---|---|---|---|---|---|
| Example | 6 | AD-9 | 100 | | 70 | | 370 PETf |
| ple | 7 | AD-10 | | 100 | 70 | | 390 PETf |
| Comp. | 4 | AD-11 | 100 | | | 70 | 250 |
| Example | 5 | AD-12 | | 100 | | 70 | 280 |

In Examples 6 and 7, Comparative Examples 4 and 5 and Table 5,

PES: Polyester diol (number average molecular weight=1,000) obtained from ethylene glycol/neopentyl glycol =30/70 (mole ratio) and isophthalic acid/sebacic acid=60/40 (mole ratio)

C-HX: HDI-derived, isocyanurate bond-containing polyisocyanate curing agent (Coronate HX, a trade name of NIPPON POLYURETHANE INDUSTRY CO., LTD.)

PET: Polyethylene terephthalate

VM-CPP: Non-oriented polypropylene film coated with aluminum by vapor deposition PETf: PET material failed.

As described above, according to this invention, it has become possible to provide a polyisocyanate curing agent for a laminate adhesive which is excellent in heat-resistance, durability and adhesiveness to a metallic film and polyolefin film and a laminate adhesive comprising the polyisocyanate curing agent, and also suitable use of the laminate adhesive in the film lamination becomes possible.

What is claimed is:

1. A laminate adhesive for a flexible laminate, said laminate adhesive consisting essentially of (1) an active hydrogen-containing polyurethane resin, and (2) a hydrophilic polar group-containing polyisocyanate obtained by reacting an organic polyisocyanate with a polyoxyalkylene ether mono-ol, a polyoxyalkylene ether polyol or a polyoxyalkylene-fatty acid ester mono-ol, each of which contains ethylene oxide unit in a proportion of at least 50 mole %, said laminate adhesive retaining flexibility upon curing.

2. The laminate adhesive of claim 1, wherein the organic polyisocyanate is an isocyanurate bond-containing polyisocyanate derived from hexamethylene diisocyanate or a polyisocyanate having isocyanurate bond and uretdione bond derived from hexamethylene diisocyanate.

3. The laminate adhesive according to claim 1, wherein the active hydrogen-containing polyurethane resin is an active hydrogen-containing polyurethane resin having a number average molecular weight of 500 to 100,000.

4. The laminate adhesive according to claim 1, wherein the active hydrogen-containing polyurethane resin is an active hydrogen-containing polyurethane resin having a number average molecular weight of 800 to 100,000.

5. The laminate adhesive according to claim 1, wherein the solids content blending ratio of the active hydrogen-containing polyurethane resin and the hydrophilic polar group-containing polyisocyanate is 1 to 200 parts by weight of the polyisocyanate per 100 parts by weight of the active hydrogen-containing polyurethane resin.

6. In a method of laminating a film to a substrate comprising interposing an adhesive between said film and said substrate, the improvement wherein said adhesive is the adhesive of claim 1, further comprising curing said adhesive.

7. The method of claim 6, wherein said substrate comprises a metal foil.

8. The method of claim 6, wherein the active hydrogen-containing polyurethane resin is an active hydrogen-containing polyurethane resin having a number average molecular weight of 500 to 100,000.

9. The method of claim 6, wherein the active hydrogen-containing polyurethane resin is an active hydrogen-containing polyurethane resin having a number average molecular weight of 800 to 100,000.

10. The method of claim 6, wherein the solids content blending ratio of the active hydrogen-containing polyurethane resin and the polyisocyanate is 1 to 200 parts by weight of the hydrophilic polar group-containing polyisocyanate per 100 parts by weight of the active hydrogen-containing polyurethane resin.

11. A polyisocyanate curing agent for a laminate adhesive which comprises a hydrophilic polar group-containing polyisocyanate obtained by reacting an organic polyisocyanate with a polyoxyalkylene ether mono-ol, a polyoxyalkylene ether polyol or a polyoxyalkylene-fatty acid ester mono-ol, each of which contains ethylene oxide unit in a proportion of at least 50 mole %.

12. The polyisocyanate curing agent for a laminate adhesive according to claim 11, wherein the organic polyisocyanate is an isocyanurate bond-containing polyisocyanate derived from hexamethylene diisocyanate or a polyisocyanate having isocyanurate bond and uretdione bond derived from hexamethylene diisocyanate.

* * * * *